Jan. 17, 1950 W. E. BRADLEY 2,494,795

FREQUENCY-DETECTOR AND FREQUENCY-CONTROL CIRCUITS

Filed Feb. 3, 1945 3 Sheets-Sheet 1

Inventor:
William E. Bradley
by his Attorneys
Howson & Howson

FREQUENCY-DETECTOR AND FREQUENCY-CONTROL CIRCUITS

Filed Feb. 3, 1945 3 Sheets-Sheet 2

Inventor:
William E. Bradley
by his Attorneys
Howson & Howson

Inventor:
William E. Bradley
by his Attorneys
Howson & Howson

Patented Jan. 17, 1950

2,494,795

UNITED STATES PATENT OFFICE 2,494,795

FREQUENCY-DETECTOR AND FREQUENCY-CONTROL CIRCUITS

William E. Bradley, Swarthmore, Pa., assignor, by mesne assignments, to Philco Corporation, Philadelphia, Pa., a corporation of Pennsylvania Application February 3, 1945, Serial No. 576,057

25 Claims. (Cl. 250—27)

This invention relates to frequency modulation circuits. More specifically the invention relates to frequency control circuits and to frequency modulation detectors, and still more particularly to an improved frequency modulation detector of the synchronized oscillator type.

Frequency modulation detectors comprising synchronized oscillators in combination with a suitable phase detecting means, the latter providing an output signal proportional to the phase difference between the received signal and the oscillator signal, are now well known. Typical of this broad class of detectors is that described in Patent No. 2,332,540, issued to Charles Travis, October 26, 1943.

Prior to my completion of the present invention, the art had been aware of two general types, or sub-classes, of the synchronized oscillator detector. The first of these, and perhaps the best known, comprises a directly synchronized oscillator which functions as a partial limiter and which absorbs real power from the source which supplies the received frequency-modulated signal to the detector. The detector described by J. R. Woodyard, Proc. I. R. E., vol. 25, pp. 612–619, as well as the detector described in Patent No. 2,356,201, issued to G. L. Beers, August 22, 1944, are representative of this type of synchronized-oscillator detector. The second type, or sub-class, comprises an indirectly synchronized oscillator which is synchronized with the frequency-modulated carrier by means of an auxiliary frequency control tube which is supplied with a low frequency control signal derived from the phase detector. This control signal includes both audio and direct current components. Detectors of this type do not, if properly designed, absorb any power from the signal supplying source. The detector described in the above-identified Travis patent is of this type.

While synchronized oscillator detectors of both types have proven useful in certain specific applications, it has been found, in practice, that they are inherently subject to serious limitations. Thus, for example, the directly synchronized type of detector, since its oscillator absorbs real power from the detector input circuit, is deleteriously affected by changes in amplitude of the received signal and hence also by noise. It is therefore usually necessary to provide one or more amplitude limiter stages ahead of such detectors. The oscillator of the indirectly synchronized type of detector absorbs no power from the detector input circuit, and so this type-2 detector is not subject to the limitation described above with reference to the type-1 detector. However, due to the indirect method of synchronization employed, the type-2 detector tends to be sluggish in operation and hence is not as insensitive to rapid signal amplitude variations, as might be desired.

The frequency modulation detector of the present invention, although it falls in the broad class of synchronized-oscillator detectors, differs materially from those known heretofore, and cannot be included in either of the two sub-classes described above. Rather, the detector of the present invention represents, so far as I am aware, a synchronized oscillator detector of an entirely new type. The synchronized oscillator of this improved frequency modulation detector absorbs no power from the source which supplies the received frequency modulated signal to the detector. The oscillator is synchronized with the frequency modulated carrier signal not by means of a sluggish audio frequency control circuit, but rather by the direct application of a radio frequency control voltage derived from an auxiliary source. This radio frequency control voltage, in the preferred embodiment of the invention, is in a quadrature, or wattless, relation to the oscillator signal, and consequently, although the quadrature control signal normally varies substantially in amplitude, such amplitude variation cannot affect the amplitude of the oscillator signal. Because of this mode of operation, to be described in detail hereinafter, the frequency modulation detector of the present invention is highly reliable and is so insensitive to amplitude variations of the received signal that the use of amplitude limiters, with their known lack of efficiency, is unnecessary even under the most severe noise conditions.

It is an object of the present invention to provide an improved circuit for synchronizing an oscillator with a signal, either at the said signal's fundamental frequency, or at a sub-harmonic thereof.

It is a further object of the present invention to provide a frequency modulation detector which is insensible to amplitude modulation.

It is another object of the invention to provide a frequency modulation detector having a high gain, and capable of providing a high level audio output signal.

It is another object of the invention to provide a frequency modulation detector having a truly linear operating characteristic.

It is still another object of the invention to provide a novel frequency modulation detector of the synchronized oscillator type.

It is another object of the invention to provide a true frequency modulation detector which is directly responsive to frequency variations, but substantially non-responsive to amplitude variations, of an applied wave.

It is another object of the invention to provide a frequency modulation detector which eliminates the need for converting the frequency modulated wave to an amplitude modulated hybrid wave before detection.

It is a further object of the invention to provide a novel frequency control circuit which is adapted for use with frequency modulation detectors of the synchronized oscillator type.

It is a further object of the invention to provide a fast acting frequency control circuit in combination with a synchronized oscillator in a frequency modulation detector.

It is another object of the invention to provide a novel frequency control circuit which is so constructed and arranged as to insure that only reactive power is supplied to the controlled oscillator.

These and other objects of the invention, and the manner in which they are attained, will appear from the following detailed description and the accompanying drawings in which Figs. 1 and 2 are simplified diagrammatic representations of two forms of the invention;

Fig. 3 is a schematic illustration of one embodiment of the invention;

Figs. 4*a*, 4*b*, and 4*c* comprise a series of explanatory diagrams;

Figure 1:
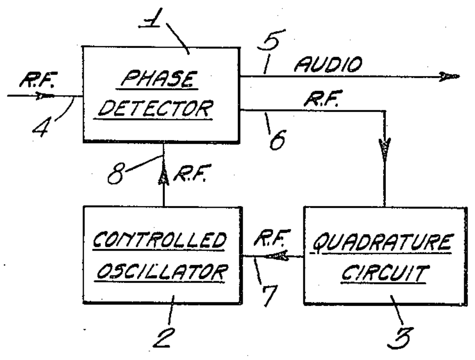
Figure 2:
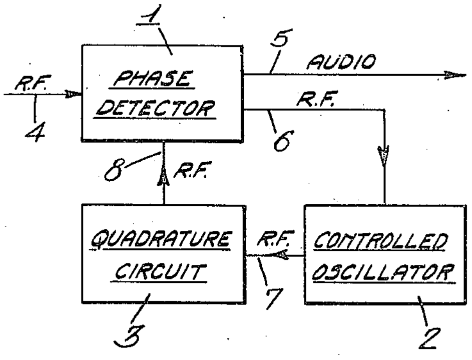

Reference may now be had to the diagrammatic representations of Figs. 1 and 2 which illustrate two general forms of the invention. Specific embodiments of the form illustrated in Fig. 1 will be described hereinafter with reference to Figs. 3, 7, and 8, while a specific embodiment of the form illustrated in Fig. 2 will be described hereinafter with reference to Fig. 9.

Both of the frequency modulation detectors illustrated in Figs. 1 and 2 comprise, in novel combination, a phase detector 1, a controlled oscillator 2, and a quadrature circuit 3. The frequency modulated carrier signal (preferably at intermediate frequency) is applied to an input terminal of the phase detector 1 by way of the conductor 4. The detected audio frequency signal may be derived from the phase detector 1 by way of the conductor 5. The other paths illustrated, 6, 7, and 8, are carrier frequency paths (R. F.).

The phase detector 1 comprises a vacuum tube circuit constructed and arranged to provide an output component, the magnitude of which is proportional to the phase difference between the frequency modulated carrier applied at 4 and the oscillator signal applied at 8. As will be described in detail hereinafter, the mean phase angle between these signals is 90° (i. e. phase quadrature), the phase relation existing when the carrier applied at 4 is undeviated, i. e. when it is at its center frequency; however, when the applied carrier is frequency modulated, this phase relation varies about quadrature as center, departing therefrom by as much as 45° or more, depending upon the magnitude of the deviation of the applied carrier. In practice, the phase detector is a device whose output is proportional to the product of the effective values of the high frequency signals applied thereto, multiplied by the cosine of the phase angle therebetween. The phase detector is preferably so constructed and arranged that its plate current is substantially identically in phase with the oscillator signal voltage regardless of the phase of the applied carrier signal voltage. This preferred mode of operation constitutes an important feature of the invention, and is attained by operating the phase detector under class C conditions. In accordance with another feature of the present invention, the phase detector provides two output components, both of which may be usefully employed. The first is an R. F. component which is utilized as a control signal to control the frequency of the oscillator 2. The second is an A. F. component which may be employed as the detected audio output.

The controlled oscillator 2 is an oscillator whose frequency may be readily varied by the application thereto of a suitable quadrature voltage.

The quadrature circuit 3 is a circuit whose function it is to provide a quadrature control voltage for the oscillator 2. This quadrature circuit may either precede or follow the oscillator 2, as indicated in Figs. 1 and 2 respectively. In fact, as will be more evident hereinafter, the desired quadrature relation may, in general, be attained by the provision of a $\phi$-degree phase changer preceding the oscillator, and a $(90-\phi)$-degree phase changer following the oscillator.

Although a more detailed description of the modus operandi of the present invention will be provided hereinafter with specific reference to the circuit diagrams of Figs. 3, 7, 8 and 9, an understanding of the invention will be better afforded if the operation of the system is first described, in general terms, with reference to one of the simplified illustrations. Referring therefore to the embodiment of Fig. 1, the tank circuit tuning of the oscillator 2 is so adjusted that, when an undeviated carrier is applied to the phase detector over the path 4, the operating frequency of the oscillator is identical to the frequency of the undeviated carrier, with the signal voltage generated by the oscillator in phase quadrature relation with the applied carrier signal voltage. This phase relation is maintained by the R. F. control voltage supplied to the oscillator by way of the path 6, the quadrature circuit 3, and the path 7. Now when the incoming carrier is shifted in frequency, the amplitude of the R. F. component of output of the phase detector 1 will change, and this change will be in such direction as to cause the frequency of the oscillator 2 to follow that of the applied carrier. Of course, the initial phase quadrature relation will not be maintained as the frequency of the applied carrier varies, the departure from phase quadrature being a function of the deviation of the applied carrier wave. Because of this variation about the mean quadrature relation, the phase detector will supply a low frequency output component, the magnitude of which is proportional to the deviation of the applied carrier from its mean frequency. This low frequency component may be utilized as the detected output of the system.

The R. F. output component of the phase detector 1 also varies in magnitude as the applied carrier varies about its mean frequency value, and it is this component which is applied to the oscillator in quadrature phase to control or vary the frequency thereof in accordance with the frequency variation of the applied carrier. It is interesting to note that no low frequency control voltage is applied to the oscillator, nor is the usual reactance tube provided. Moreover, as will be more apparent hereinafter, when the R. F. control voltage applied to the oscillator 2 is in a strictly quadrature (i. e. wattless) relation to the oscillator signal (as it inherently is in the preferred class C operation of the phase detector), variations in amplitude of the quadrature signal cannot affect the amplitude of the oscillator signal. The frequency of the oscillator signal, however, varies linearly with the high frequency output component of the phase detector 1.

An important aspect of the invention resides in the fact that while there is an R. F. path extending directly from the controlled oscillator 2 to the phase detector 1, there is no direct R. F. path in the opposite direction, and consequently the applied carrier signal cannot affect the oscillator 2 in any way except in the manner desired, i. e. by way of the output path 6 of the phase detector.

Figure 3:
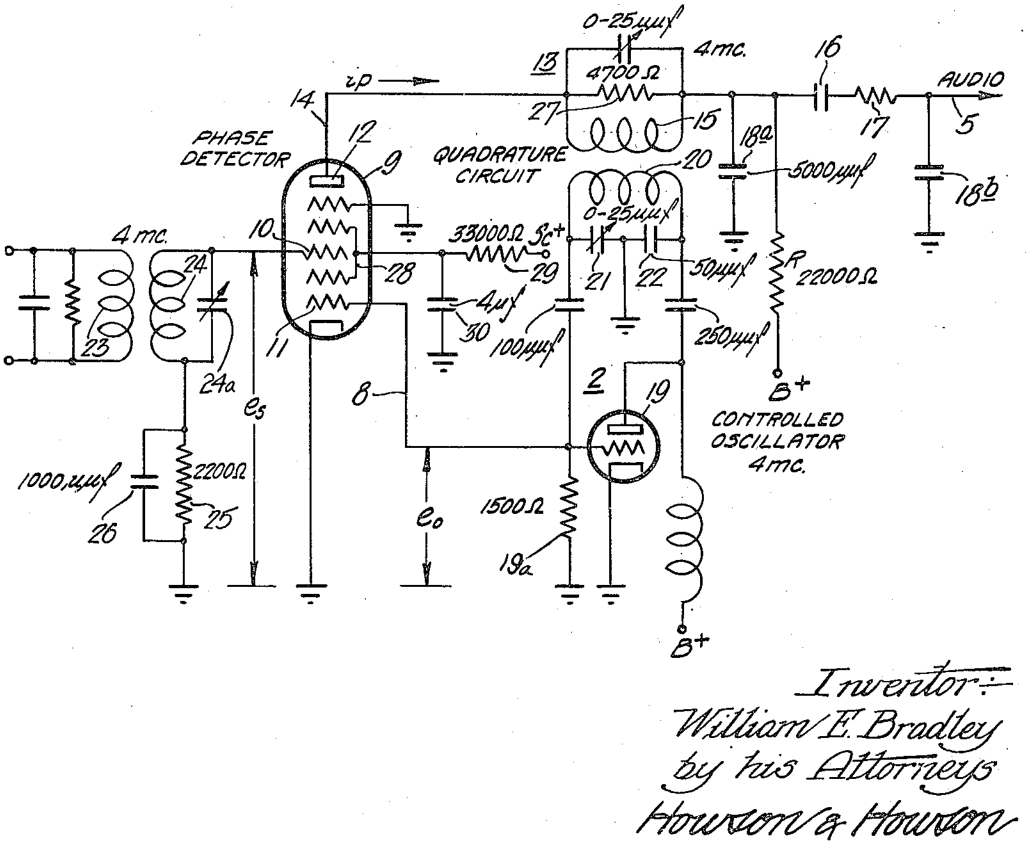

Reference may now be had to the schematic diagram of Fig. 3, which illustrates a practical embodiment of the invention. To facilitate an understanding of the circuit the legends employed in Fig. 1 have been applied to the corresponding portions of Fig. 3. Moreover, for convenience, the operating frequency and the specific values of the more important electrical components have been indicated directly on the drawing. Although representative of values which have been successfully employed in practice, it will, of course, be apparent to those skilled in the art that these values are subject to considerable variation by the designer.

The phase detector of the circuit of Fig. 3 comprises a multi-grid tube 9 having R. F. input grids 10 and 11, a radio frequency output circuit comprising the anode 12 and the resonant plate circuit 13, and an audio frequency output circuit comprising the anode 12, the conductor 14, the inductance coil 15 (which, of course, has no effect on the audio frequency circuit), the audio-frequency plate load resistor R, the coupling condenser 16, and the R. F. filter combination 17—18*a*—18*b*. The phase detector tube 9 may be a type 6SA7 heptode. However, the salient characteristics of an improved tube of this general variety, more particularly adapted for use in the present invention, will be described briefly hereinafter.

The controlled oscillator comprises the triode 19 in combination with a tank circuit consisting of the inductance coil 20 and the condensers 21 and 22 connected serially thereacross. This oscillator is of the well known Colpitts type, and therefore it need not be described in detail.

The quadrature circuit comprises the resonant circuit 13 inductively coupled to the tank circuit 20—21—22 of the oscillator. The resonant circuit 13 is connected in the R. F. plate circuit of the tube 9. The low potential end of the resonant circuit is returned to ground through the R. F. by-pass condenser 18*a*.

The received frequency modulated carrier signal, preferably converted to an intermediate frequency, may be applied to the input grid 10 by means of a conventional tuned transformer comprising a primary winding 23 and a secondary winding 24. Preferably the tuned secondary circuit is designed to have a fairly low L./C. ratio (i. e., relatively low inductance 24 and a relatively high capacitance 24*a*) so that the impedance, at the operating carrier frequency, between the grid 10 and ground is low rather than high. The reason for this will be brought out hereinafter. The signal grid 10 of the phase detector tube 9 may be biased by inserting, in the grid return circuit, a grid leak 25 shunted by an R. F. by-pass condenser 26. While not necessary to a realization of all of the features of the invention, it is preferred that the oscillator signal and bias voltages supplied to grid 11 of phase detector tube 9 be of such magnitude that the tube 9 operates under class C conditions. A class C mode of operation in which plate current flows in the tube 9 during only about 60° out of each 360° has been found useful in practice.

In the remainder of the specification, the description is particularly directed to the preferred class C embodiments of the invention. Where other modes of operation (e. g. class A or class B) are considered, such modes are specifically identified.

Where the phase detector is operated under class C conditions, relatively short, high amplitude pulses of plate current, at oscillator frequency, are supplied by the tube 9 to the resonant plate circuit 13. Substantially only the fundamental component of this pulse signal appears across the resonant circuit 13, and it is this component which is applied, by virtue of the mutual inductance coupling between the windings 15 and 20, to the tank circuit 20—21—22 of the oscillator tube 19. Now although the fundamental component of voltage established across the resonant circuit 13 due to the plate current is, inherently, precisely in phase with the oscillator signal voltage applied to grid 11 of the phase detector tube 9, the voltage applied to the tank circuit of the oscillator through the mutual inductance coupling will be in precise phase quadrature relation with the corresponding voltage generated in the tank circuit by the oscillator. Consequently the voltage so applied to the oscillator tank circuit will have the same effect as the shunting thereacross of an equivalent pure reactance. Stated differently this voltage is a quadrature frequency-control voltage, and as such may be employed to control the frequency of the oscillator. Whether the equivalent shunt reactance is inductive or capacitive depends, of course, upon the relative direction, or phasing, of windings 15 and 20. I have found it expedient to so phase the windings that an increase in phase detector plate current will produce a decrease in oscillator frequency.

That the voltages across the primary and secondary windings of tuned transformers are in phase quadrature relation is too well known to require comment. It need only be said that, since, in the present invention, this phase quadrature relation is preferably maintained substantially constant throughout the band, the resonant circuit 13 is preferably heavily damped, and the coupling between the two circuits is somewhat less than critical coupling. With reference to the circuit shown schematically in Fig. 3, it was found that a damping resistor 27 of 4700 ohms insured a very flat response over the deviation band and accurately maintained the phase quadrature relation throughout this band. In general, under these conditions, the pass-band of the resonant circuit 13 is at least several times the deviation band of the received frequency modulated carrier.

Although the resonant circuit 13 and the tuned circuits preceding the phase detector tube 9 are tuned about the frequency of the undeviated carrier signal as a center, the tank circuit 20—21—22 of the controlled oscillator is tuned somewhat outside the deviation band of the signal to be received. This is because the quadrature control signal derived by way of the resonant circuit 13 always exerts a tuning influence on the oscillator, whether the carrier signal applied to the control grid 10 of the phase detector tube 9 be deviated or not. Indeed, this tuning effect is present even in the absence of such carrier signal, since the oscillator supplies its own quadrature control signal through the agency of the phase detector tube and the quadrature circuit.

Figure 9:
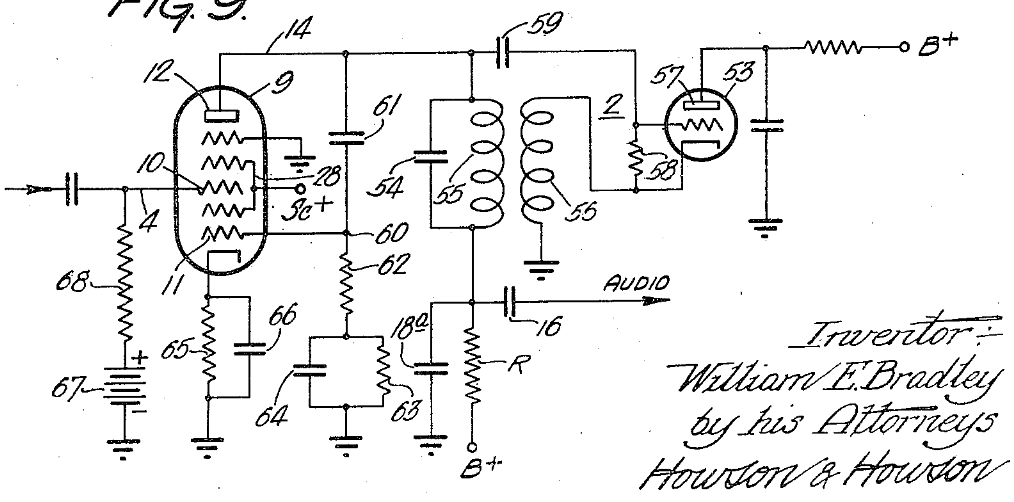
Fig. 9 is an alternative form of the invention.

In order that the preferred class C mode of operation (or any other selected mode of operation) of the phase detector tube 9 may be maintained over long periods, in spite of circuit variations and tube aging, I prefer to employ an appreciable degree of direct current stabilization in the operation of the tube 9. This may be most conveniently provided by supplying screen potential to the screen grid 28 through a relatively high series resistance 29. In order to avoid the occurrence of degeneration at audio and radio frequencies a relatively large by-pass condenser 30 may be connected between the screen grid 28 and cathode or ground. Alternatively, other methods of direct current stabilization may be employed, such as a by-passed cathode resistor, in combination, if necessary, with positively biased grid return connections. This method of direct current stabilization is illustrated in Fig. 9, to be referred to hereinafter.

Although, in the circuit illustrated in Fig. 3, the oscillator voltage $e_o$ and the received carrier signal $e_s$ are applied to grids 11 and 10 respectively, I desire it to be understood that substantially similar results may be obtained by reversing these connections.

The final adjustment and alignment of the circuit shown in Fig. 3 may be conveniently accomplished as follows. (1) With the coil 15 open-circuited, the oscillator tank circuit 20—21—22 is tuned to the center of the desired band (the frequency $f_c$ in Fig. 6). This is readily done by adjustment of the variable condenser 21. (2) With the coil 15 reconnected, the circuit 13 is tuned for minimum oscillator grid current (minimum direct current voltage across the oscillator's grid leak). This is an indication that the resonant circuit 13 is tuned approximately to oscillator frequency. (3) From a low impedance source an audio frequency signal (conveniently 60 cycles) of about one volt peak amplitude is impressed across the resistor 25. If now the tuned circuit 13 is not properly adjusted, the audio frequency signal applied to grid 10 of tube 9 will produce amplitude modulation of the oscillator 2. The presence of such amplitude modulation may conveniently be determined by connecting an oscilloscope through a high resistance (e. g. one megohm) across the grid leak 19*a* of oscillator 2 to measure the audio frequency component of voltage across the said grid leak. It will be found that the phase of this audio voltage can be made to reverse smoothly as the circuit 13 is tuned through resonance with the oscillator tank circuit, and that, at the point of phase reversal, the voltage of the audio component passes through zero. This is the correct adjustment of the relative frequencies of the circuits 13 and 20—21—22. With this adjustment the plate current variations in the phase detector tube, produced by the audio signal applied to grid 10, do not cause amplitude modulation of the oscillator. It will be observed, however, that, in accordance with the principles of the invention, the frequency of the oscillator is varied, or deviated, in accordance with the audio signal applied to grid 10. (4) Since adjustment #3 may leave the oscillator detuned slightly from its center frequency $f_c$, it is desirable at this point, and with no signal on grid 10 of the phase detector tube, to retune the oscillator to the said center frequency. Adjustment #3 may then be repeated, and if necessary adjustments #3 and #4 repeated until a final fixed adjustment is obtained. If now, by way of experiment, the phase detector tube be removed from its socket, or the conductor 14 cut, it will be found that the oscillator frequency will shift to a point outside the band. The frequency at this point is designated $f_u$ in Fig. 6. It is to be noted, however, that one aligning the detector need not determine the frequency $f_u$ when the alignment procedure outlined above is followed.

I have found that where the electron transit time in the phase detector tube is appreciable, the phase of the current supplied by said tube may be shifted slightly as a result of the said transit time. Under these conditions the phase shift introduced by the "quadrature" circuit should be such that the net or total phase shift is equivalent to a quadrature shift. An advantage of the method of alignment set forth above is that it results in the proper phase adjustment regardless of the physical disposition of the component phase shifts.

As has been indicated above, it is preferred that the magnitude of the direct current and oscillator signal voltages applied to the grid 11 of phase detector tube 9 be such that class C operation of the tube obtains. For a more detailed description of this preferred mode of operation, reference may be had to the explanatory diagrams of Figs. 4*a*, 4*b* and 4*c*. In each of these diagrams the wave forms of phase detector plate current $i_p$, and of the received carrier signal voltage $e_s$ applied to the grid 10 of tube 9, are plotted against time as abscissae. In the interests of simplicity the oscillator signal voltage $e_o$ has been illustrated in Fig. 4*a* only, since its position and magnitude is identical for each of the three diagrams, i. e., in each instance the positive peaks of the oscillator signal $e_o$ occur coincidentally with the plate current pulses, $i_p$.

Figure 4A:
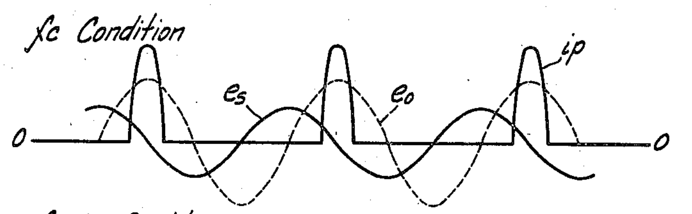

The quadrature phase relation which exists between the applied carrier signal voltage $e_s$ and the oscillator signal voltage $e_o$, for the condition where the voltage $e_s$ occurs at the mean, or center, frequency $f_c$, is illustrated in Fig. 4*a*. The relatively short pulses of plate current $i_p$ (which under all of the conditions illustrated, as well as for the no-signal condition, occur in precise synchronism with the peaks of the oscillator signal voltage $e_o$) are centered about alternate zero-values of the signal voltage $e_s$. For this $f_c$-condition the only effect of the signal voltage $e_s$ on the plate current pulses $i_p$ is slightly to affect their symmetry while not affecting their energy content. Since with class C amplifiers this slight lack of symmetry, as shown both by theory and by practice, is of no significance, no attempt has been made to illustrate it in the drawings.

One of the important advantages, incidentally, which the class C mode of operation offers, resides in the fact that it makes the operation of the detector substantially insensible to changes in plate-current wave shape.

Figure 4B:
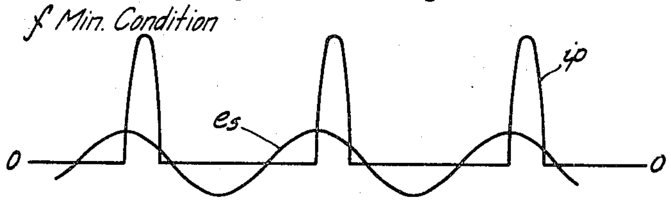

Assume now that the frequency of the applied carrier signal voltage $e_s$ is decreased to, say, its minimum frequency value, $f_{min}$. Due to the frequency control action of the system, hereinbefore described, the oscillator will remain in synchronism with the applied carrier signal, but the normal phase quadrature relation existing between the carrier signal voltage $e_s$ and the oscillator voltage $e_o$ (and hence also the plate current pulses $i_p$) will be altered. The $f_{min}$-condition is illustrated in Fig. 4*b*. Here the plate current pulses $i_p$ occur only during portions of the positive alternations of the signal voltage $e_s$. This means that throughout the entire interval of each plate current pulse $i_p$, the signal and oscillator voltages, $e_s$ and $e_o$, aid the flow of plate current, and consequently the magnitude of the plate current pulses is greatly increased. It is important to note, however, that although the phase angle between the signal voltage $e_s$ and the oscillator voltage $e_o$ is now closer to 45° than to 90°, the control signal supplied to the oscillator by way of the quadrature circuit is still a purely wattless (quadrature) signal because its phase is inherently governed by the oscillator voltage $e_o$, and not by the carrier signal voltage $e_s$.

Figure 4C:
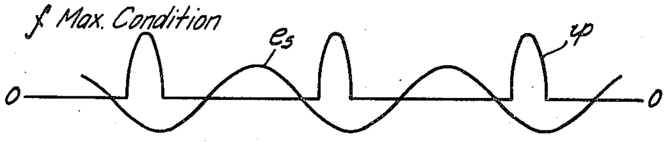

The other limiting condition, the condition where the frequency of the applied carrier signal voltage $e_s$ is increased to its maximum-frequency value, $f_{max}$, is illustrated in Fig. 4*c*. Here the plate current pulse $i_p$ occur only during portions of the negative alternations of the signal voltage $e_s$. This means that throughout the entire pulse interval the signal and oscillator voltages, $e_s$ and $e_o$, oppose each other, and consequently the magnitude of the plate current pulses is greatly decreased.

It is this variation in magnitude of the R. F. component of plate current in response to variations in frequency of the applied signal voltage $e_s$, as illustrated in Figs. 4*a*, 4*b*, and 4*c*, which accounts for the variation in magnitude of the R. F. control signal applied to the oscillator tank circuit by way of the quadrature circuit, and which in turn effects the desired synchronization of the oscillator with the signal voltage. Moreover, since the frequency variations of the signal voltage $e_s$ occur at an audio frequency rate, it will be evident that the plate current flowing in the phase detector tube includes an audio frequency component. It is this audio frequency component of plate current which establishes the desired audio frequency output voltage across the load resistor R of Fig. 3. In practice, audio output voltages of the order of 30 volts, peak to peak, are obtainable from detectors constructed in accordance with the principles of the present invention.

A further significant advantage which class C operation of the phase detector tube provides, resides in the fact that the wave form of the plate current pulses is such that the fundamental frequency component of plate current is strictly proportional to the direct current component of plate current regardless of small changes in such wave form. Specifically, the peak value of the fundamental is always equal to twice the direct current component. Of course, it will be understood that both the fundamental and direct current components vary at an audio frequency rate in accordance with the deviations of the applied carrier signal. Since the fundamental component of plate current is the sole means by which the oscillator frequency is controlled, this fundamental current component is linearly related to the carrier signal frequency so long as the oscillator is locked in synchronism therewith. But since the direct current component varies directly with the fundamental current component, the detected output of the detector is always an accurate linear function of frequency modulation of the applied carrier signal $e_s$.

Figure 5:
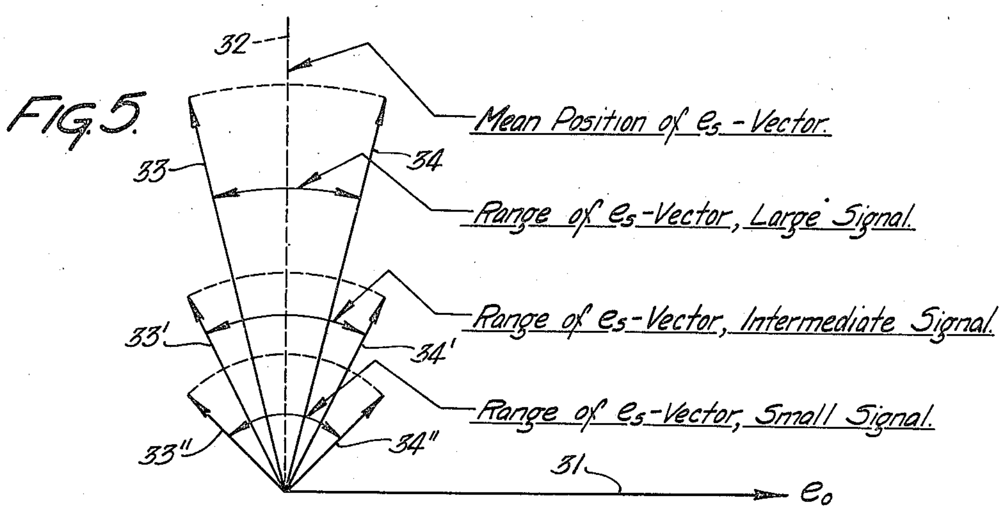
Fig. 5 is a vector diagram showing certain of the phase relations involved in the circuits of the invention.

The reaction of the system of the present invention to applied carrier signals of different magnitudes is illustrated by the vector diagram of Fig. 5. In this diagram the relative phase relation between the oscillator signal voltage $e_o$ and the applied carrier signal voltage $e_s$ is designated by the angle between the vector 31 representing $e_o$ and the other vectors representing $e_s$. The mean, or unmodulated, position of the $e_s$ vector is that designated by the dashed line 32. This is in accordance with the fact that the phase angle between $e_o$ and $e_s$, for the case where $e_s$ is at the center or mean frequency, is 90°.

If now a frequency-modulated carrier signal voltage $e_s$ of relatively large magnitude be applied to the system, the phase relation between the voltages $e_o$ and $e_s$ will, as we have seen, vary about the phase quadrature condition as center. An illustration of the phase relations obtaining under the condition of maximum rated frequency deviation (on both sides of the mean frequency) is afforded by the vectors 33 and 34 which represent the limits of phase deviation from the mean quadrature relation for the case of a relatively large signal. Assume now that a signal $e_s$ of intermediate magnitude be supplied to the phase detector, said signal being represented by the vector 33'. With this intermediate signal amplitude, and under the same condition of maximum rated frequency deviation, the limits of relative phase deviation are represented by the vectors 33' and 34'. Similarly, the limits of relative phase deviation for a relatively small signal are represented by the vectors 33'' and 34''.

The vector diagram of Fig. 5 clearly illustrates how, as the magnitude of the applied signal $e_s$ is decreased, the deviation of the $e_s$-vector about its mean quadrature phase position increases. It is by virtue of this increase in phase deviation with decrease in signal strength, that the detector is enabled to maintain constant detected output irrespective of signal strength so long as synchronism between the oscillator and the signal is maintained. Attention is called to the fact that the vector diagram is strictly realistic in so representing the $e_s$-vectors that their projections on the horizontal axis (i. e. on the $e_o$-vector) are identical for corresponding positions in their ranges. In fact it is for this reason that the product of the effective values of $e_s$ and $e_o$, multiplied by the cosine of the phase angle therebetween, is independent of the magnitude of the signal voltage $e_s$. This will be evident from the fact that the product of any one of the $e_s$-vectors and the cosine of the angle between the said $e_s$-vector and the $e_o$-vector 31, is equal to the projected length of the said $e_s$-vector on the $e_o$-vector. The foregoing indicates, in brief, the mathematical basis for the statement that the frequency modulation detector of the present invention is insensible to amplitude modulation, and hence substantially insensible to noise.

Here again it is emphasized that although the phase angle between the voltages $e_s$ and $e_o$ varies about quadrature, as illustrated in Fig. 5, the phase angle between the oscillator signal and the radio frequency control signal supplied to the oscillator is always inherently 90° if the phase detector is operated under class C conditions.

An important feature of frequency modulation detectors embodying the present invention resides in the rapidity with which such detectors react, in response to amplitude changes in the carrier signal, to maintain a detected output signal which is independent of such amplitude changes. This feature of the invention is due largely to the substantially delay-less action of the frequency control circuits, and to the use of a radio frequency, rather than audio frequency, control voltage. In this connection, attention is particularly directed to the fact that although an audio frequency component of voltage is generated in the phase detector tube this component is not employed as a frequency control voltage (as it is, for example, in the circuits described and illustrated in the above-mentioned patent of Charles Travis). Actual tests have shown that frequency modulation detectors embodying the present invention exhibit time constants (the time for the oscillator to reach substantial phase equilibrium following an abrupt change in carrier signal frequency or amplitude) of the order of 5 microseconds or less. This is actually less than the time constant of a conventional intermediate frequency amplifier stage. The practical significance of this is that the invention thus provides a detector which is fully capable of compensating for the effects of any amplitude modulation (noise) components which the intermediate frequency amplifier can supply.

Where it is desired to reduce the time constant of the frequency modulation detector circuit to a very low value, the mutual conductance and plate current of the phase detector tube, and the L./C. ratio of the oscillator tank circuit, should all be relatively high.

Figure 6:
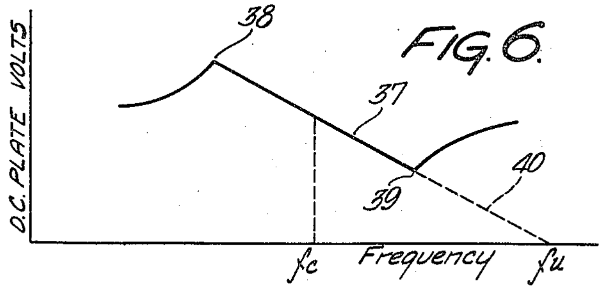
Fig. 6 is an explanatory diagram which represents a typical operating characteristic exhibited by detectors of the present invention.

A typical operating characteristic 37, as exhibited by detectors of the present invention, is illustrated in Fig. 6. The central portion of this characteristic, i. e. the portion lying between the points 38 and 39 is perfectly straight, as shown. In fact, a mathematical treatment of the system shows that, by the very nature of the circuits involved, the operating portion of the characteristic is inherently linear. The center or mean frequency point on the characteristic is designated $f_c$. This is the frequency of the synchronized oscillator in the absence of an applied carrier signal, or in the presence of an applied, undeviated, carrier signal. If the radio frequency control voltage, normally applied to the oscillator by way of the quadrature circuit, is removed (as for example by cutting the conductor 14 in Fig. 3) the oscillator will shift to its uncontrolled frequency $f_u$. This frequency can be found in the drawing, Fig. 6, at the intersection of the abscissa and the extended portion 40 of the linear section 37 of the characteristic.

When a receiver embodying the frequency modulation detector of the present invention is tuned to a desired carrier signal, the center frequency of the said signal is, of course, preferably tuned to coincide with the center frequency point $f_c$ on the characteristic 37 of Fig. 6. It is an important feature of the present invention, however, that, due to the self-synchronizing property of the system, this tuning operation is not at all critical, either as regards fidelity or freedom from noise and amplitude modulation effects. This is an important factor in push-button tuned radio receivers where small errors in tuning are likely to occur.

Reference has been made to the ability of detectors embodying the present invention to discriminate completely against amplitude modulation and noise. Another valuable property of these circuits resides in their ability to discriminate strongly in favor of a desired frequency modulated carrier as against a second and weaker frequency modulated carrier occupying the same frequency band or channel. Theoretically, as has been shown by published studies, an "ideal" or "perfect" frequency modulation detector should discriminate completely against common channel interference if the amplitude of the interfering signal is no more than half the amplitude of the desired signal. Frequency modulation detectors constructed in accordance with the present invention exhibit this ideal discrimination against common channel interference.

Figures 7, 8:
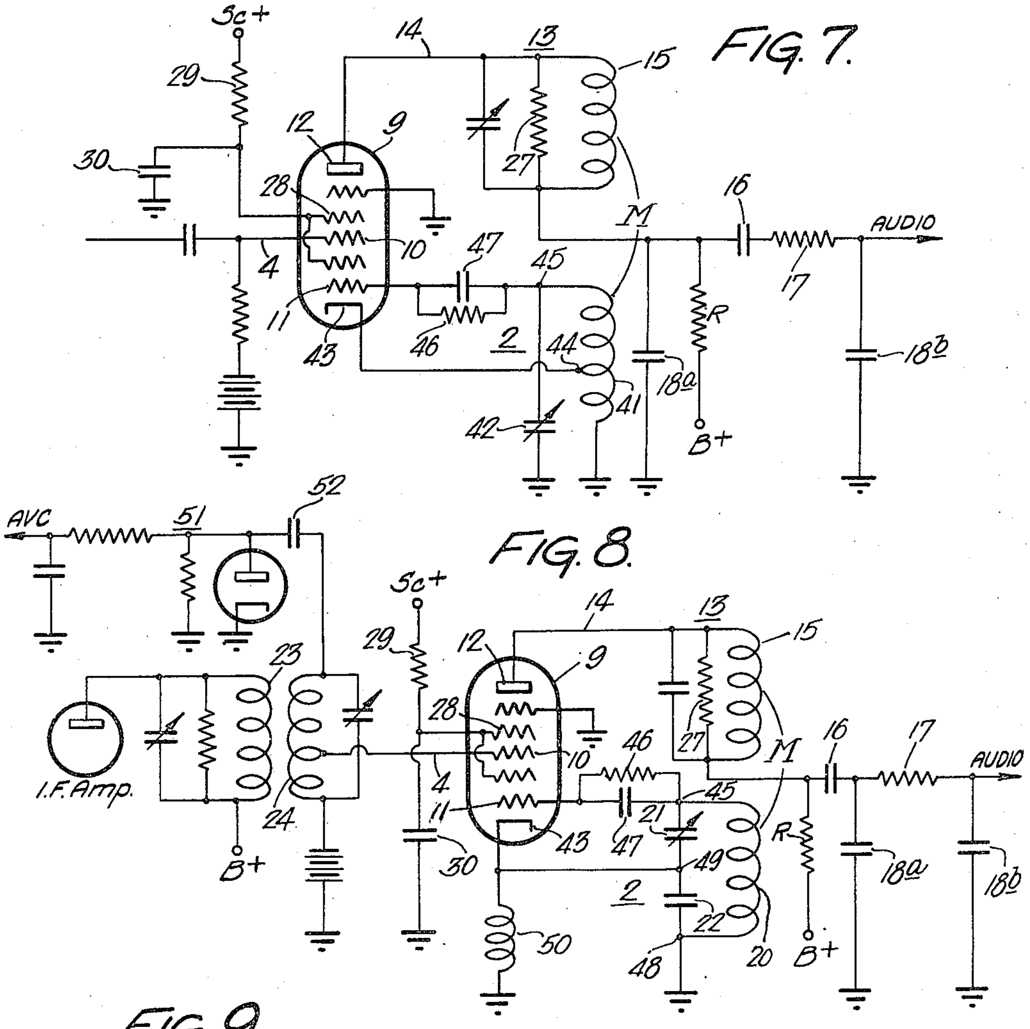
Fig. 7 is a schematic illustration of another embodiment of the invention.
Fig. 8 is a schematic illustration of a preferred embodiment of the invention.

Attention is now directed to the embodiment illustrated in Fig. 7 of the drawings. This circuit differs from that illustrated in Fig. 3 chiefly in that it utilizes a Hartley, rather than a Colpitts, type of oscillator, and furthermore in that no separate oscillator tube is provided, the electronic components of the oscillator being supplied by various electrodes of phase detector tube 9. Otherwise most of the components are similar to those described with reference to Fig. 3 and they are therefore designated by like reference characters.

The Hartley oscillator of Fig. 7 comprises a tank circuit 41—42 having one end thereof grounded. The oscillator electrodes comprise cathode 43, grid 11, and screen grid 28 of tube 9. These electrodes are connected to the intermediate tap 44, high potential end 45, and grounded end, respectively, of the tank coil 41. The screen grid (i. e. oscillator anode) connection specified is by way of the screen grid by-pass condenser 30. The grid leak and grid condenser combination 46—47 may be inserted between the grid 11 and the junction 45 as shown.

A preferred embodiment of the invention is illustrated in Fig. 8. This embodiment is similar to that of Fig. 3 in that a Colpitts oscillator is provided, but resembles Fig. 7 in that the electronic components of the oscillator are supplied by various electrodes of the phase detector tube 9. In Fig. 8 the oscillator anode (screen grid) 28 is at ground potential (for alternating voltages) as is also the lower terminal 48 of the tank circuit 20—21—22. The junction 49 between the tank circuit condensers 21 and 22 is connected directly to the cathode 43, while the latter is provided with a direct current path to ground comprising a suitable R. F. choke coil 50.

Although not an inherent characteristic of circuits embodying the present invention, I have found that better results are obtained (especially when employing tubes presently available commercially) if the internal impedance of the source which supplies the frequency modulated carrier to grid 10 is relatively small. The effective impedance of the source may be made small by the known expedient, illustrated in Fig. 8, of driving the grid 10 from a point on the winding 24 which is tapped well down from the high potential end thereof. Where it is desired to provide an automatic gain control voltage, or AVC, to the amplifier stages preceding the detector stage, such voltages may be derived conveniently from a conventional AVC circuit 51 coupled to the high potential end of the tuned winding 24 by means of a suitable condenser 52.

With reference to the circuits of Figs. 7 and 8, it is to be understood that the coupling between the broadly resonant circuit 13 and the oscillator tank circuit should be less than critical coupling for the reason already explained with reference to Fig. 3.

In the circuit diagrams of Figs. 3, 7, and 8 the quadrature circuit is interposed between the phase detector and the controlled oscillator, as it is in the diagrammatic representation of Fig. 1. In the alternative embodiment illustrated in Fig. 9, however, the quadrature circuit is interposed between the controlled oscillator and the phase detector as it is in the diagrammatic representation of Fig. 2. The circuit of Fig. 9 has also been introduced to demonstrate that, if desired, a quadrature circuit of the more conventional resistance-capacitance phase-shifting type may be employed. I prefer, however, to employ the quadrature circuits illustrated in Figs. 3, 7, and 8.

In the embodiment of Fig. 9, the phase detector tube 9 is associated with a separate oscillator circuit comprising a triode 53, a grid tank circuit 54—55, and a feedback coil 56 connected in the cathode circuit of triode 53 and inductively coupled to the tank coil 55. The grounded electrode of the triode 53, so far as R. F. is concerned, is the anode 57. A grid leak 58 and grid condenser 59 are provided in conventional manner. Assuming the preferred class C operation of the phase detector tube 9, short pulses of plate current are caused to flow in the tube 9, in phase quadrature to the oscillator tank voltage, by applying to grid 11 a voltage which is in phase quadrature to the voltage across the oscillator tank circuit 54—55. This phase-displaced voltage is derived from the junction 60 on a quadrature circuit which comprises a condenser 61 and resistor 62 whose resistance is very small compared to the reactance of the condenser 61 at the operating frequency. The shunt resistance-capacitance combination 63—64 comprises a grid leak and condenser means for biasing grid 11 to provide the desired class C operation of the tube 9.

Direct current stabilization of the phase detector tube, the purpose of which has already been described, may be provided by means of a suitably high cathode resistor 65 by-passed, for audio and radio frequencies, by the condenser 66. If the use of such cathode resistor produces too great a grid bias, the control grid 10 may be returned, through the grid leak 68, to a suitable source 67 of positive bias.

Although it is an important and highly significant aspect of the present invention that a high-quality, high-level, detected signal may be derived directly from the plate circuit of the phase detector tube 9, I wish to point out that, obviously, the frequency-modulated signal generated by the controlled oscillator of any of the embodiments illustrated may, if desired, be supplied to a conventional frequency discriminator for detection in the usual way. Such operation is not deemed generally advisable, however, since it entails considerable additional equipment without any known advantage.

While a class C mode of operation of the phase detector tube is greatly preferred because of the important advantages which it provides, it is to be understood that the present invention also contemplates the use of class A and class B modes of operation, since such modes can be employed to provide a synchronized oscillator performance which is at least comparable to that provided by prior systems. Where the class A mode of operation is employed, the radio frequency performance of the system is good, but very little detected audio frequency signal is developed in the plate circuit of the phase detector tube. It is then necessary to provide a suitable frequency discriminator and detector circuit to detect the frequency modulated signal generated by the synchronized oscillator. When such an arrangement is used it will be apparent that the circuit of the invention is employed as a special type of amplifier which ignores amplitude modulation and thus supplies to the discriminator a signal having substantially no amplitude modulation (noise) components. Where the class B mode of operation is employed, a relatively strong audio frequency signal is generated in the plate circuit of the phase detector tube. This signal may be used as the detected output of the system, but the discrimination of such a system against noise is not as perfect as it is with the class C mode of operation. In the foregoing, and for the purposes of the present specification, the term "class A" is used to denote a mode of operation in which plate current flows in the phase detector tube throughout the entire R. F. cycle of the synchronized oscillator. Similarly the term "class B" denotes a plate current flow during approximately half of each R. F. cycle, while "class C" denotes a plate current flow during less than half of each R. F. cycle.

A few supplementary comments on the phase detector tube itself are in order, since this tube is the heart of the phase detector circuit. As has already been indicated, a tube of the 6SA7 variety may be employed. Tubes of this general variety are heptodes, comprising a cathode, a first grid which may be employed as an oscillator or oscillator-injection grid, second and fourth grids interconnected internally to function as a screen grid (and simultaneously as an oscillator anode if desired), a third grid usually employed as the signal injection grid, a fifth grid normally employed as a suppressor grid, and an anode or plate. While the 6SA7 tube presently available commercially may be employed in the various circuits described herein, the 6SA7 is not regarded as the ideal tube for these circuits. Referring to the circuit diagram of Fig. 8 as typical of the invention, and bearing in mind that the frequency of the controlled oscillator 2 should be influenced only through the agency of the plate current of the phase detector tube 9, it is important that, in order to avoid transmission of signal to the oscillator 2 by other than the desired path, the fortuitous coupling between the signal injection grid 10 and other active electrodes be very small. The "active" electrodes in Fig. 8 are, of course, the cathode 43, the oscillator grid 11, the signal grid 10, and the anode 12. (In the circuits of Figs. 3 and 9, the cathode of tube 9 is not an active electrode since it is operated at ground potential so far as radio frequencies are concerned.) If the fortuitous coupling between, say, the signal injection grid 10 and the oscillator injection grid 11 is substantial, signal energy from the intermediate frequency input circuit 23—24 will be applied through said fortuitous capacity coupling to the tank circuit of the oscillator 2 as a spurious frequency control signal. This spurious control signal will not only interfere with the desired mode of control of the oscillator (and thus give rise to a spurious or distorted output signal), but it will, in addition, inject a real power component into the oscillator circuit. Since the magnitude of this injected radio frequency component is, in general, a function of both the amplitude and frequency of the applied intermediate frequency carrier signal, the oscillator signal will be amplitude modulated thereby. This amplitude modulation of the oscillator signal gives rise to a spurious audio output signal. Thus, under such conditions, the circuit is susceptible to amplitude modulation, and hence also to noise.

The fortuitous coupling capacity between the signal injection grid 10 and the oscillator grid 11, in the direction grid 10 to grid 11, may be broken into two components. The most obvious of these components is that generally referred to as the "direct interelectrode capacitance." The magnitude of this capacitance is minimized by means of the screen grid 28, a portion of which is interposed as an electrostatic shield between grids 10 and 11. The other component of fortuitous capacity is that due to space charge effects which occur during the operation of the tube. This space-charge, or electronic, coupling capacitance is usually substantially in excess of the direct interelectrode coupling capacitance. In the 6SA7 the electronic coupling capacitance is of the order of a quarter of a micromicrofarad, whereas the direct interelectrode capacitance is of the order of 0.15 micromicrofarad. While these coupling capacitances may appear to be very small, they are nevertheless large enough to interfere perceptibly with the ability of circuits embodying the present invention to discriminate against large amounts of amplitude modulation and hence noise.

The deleterious effects of the fortuitous coupling capacity between the oscillator grid 11 and the signal injection grid 10, in the direction grid 11 to grid 10, can be substantially eliminated by so designing the input circuit to grid 10 that it presents a low internal impedance between ground and the said grid. One practical expedient for ensuring a low source impedance, the use of a tapped-down secondary winding 24, has already been described with reference to Fig. 8.

Where it is intended to employ the preferred class C mode of operation, the phase detector tube 9 should, of course, have a high peak cathode-emission capability, since plate current peaks of the order of 10 to 20 milliamperes are desirable in the operation of the circuits. It is also preferred that the tube employed have sharp cut-off characteristics (in contradistinction to remote cut-off) both as regards the control characteristic from grid #1 to the screen, and from grid #3 to the anode.

A number of improved heptodes have been constructed for use with the circuits of the present invention. The salient characteristics of a typical one of these improved tubes follows: Direct interelectrode capacitance between grid #1 and grid #3, 0.017 mmf.; space charge, or electronic, coupling capacitance between grid #1 and grid #3 (in the direction grid #3 to grid #1), 0.041 mmf.; total fortuitous coupling capacitance between grid #1 and grid #3 (in the direction grid #3 to grid #1), 0.058 mmf.; direct interelectrode capacitance between grid #3 and anode, 0.046 mmf.; mutual conductance between grid #1 and the screen grid, 3900 micromhos; mutual conductance between grid #3 and the anode, 420 micromhos; control characteristics, grid #1 to screen grid, medium sharp; control characteristic, grid #3 to anode, sharp; direct current component of plate current under class C operating conditions, 1.1 milliamperes.

Although the invention has, thus far, been described with particular reference to its use in and as a frequency modulation detector, it will be evident that the invention, in various of its aspects, is adapted to other uses in the frequency detection and frequency control arts. Manifestly, for example, circuits such as those illustrated in Figs. 3, 7, 8, or 9, may readily and advantageously be employed as frequency discriminators in automatic frequency control (AFC) systems and the like. The direct current, or "control," component of the phase detector's output voltage may, of course, be derived directly from the load resistor R, and applied to the frequency control circuit by way of a suitable low-pass filter, as is customary in the automatic frequency control art.

In still another and broader aspect, the invention provides an improved reactance tube circuit having a broad field of application as an electronic reactance. This aspect of the invention may readily be described with reference to the embodiment of Fig. 3, which for the purposes of the present discussion may be regarded, not as a frequency modulation detector, but rather as an arrangement for loosely synchronizing an oscillator 2 with the signals applied to the transformer 23—24. When such synchronization is the sole object of the circuit, the low frequency load impedance R may, of course, be omitted. Under these conditions, the tube 9 might more properly be regarded as a reactance tube, whose purpose it is to vary the effective magnitude of one of the reactances comprising the resonant circuit 20—21—22 in accordance with a function of the frequency relation between the oscillator signal and the signal applied to control grid 10.

In this connection it is pointed out that, if desired, the oscillator may be adjusted to operate at a subharmonic of the frequency of the signal applied to control grid 10, after the manner of the subharmonic operation described in the copending application of C. T. McCoy, Serial No. 528,908, filed March 31, 1944, now Patent No. 2,462,759. The embodiments of Figs. 3, 7, and 8 may readily be adapted for such subharmonic operation by resonating the oscillator tank circuits, and the associated quadrature circuits, to the desired subharmonic frequency. In the embodiment of Fig. 9, only the oscillator tank circuit 54—55 need be tuned to the desired subharmonic frequency. Although such subharmonic operation of the oscillator may have advantages under certain conditions, I have found it expedient to operate the synchronized oscillator at the signal frequency rather than at a subharmonic frequency.

In still another aspect of the invention, the "reactance tube" 9 may be utilized to control the resonant frequency of a tuned circuit irrespective of the source of the voltage across said circuit. Referring again to Fig. 3, the alternating voltage applied to the resonant circuit 20—21—22 may be regarded as derived from any external source of waves of the desired frequency, the oscillator tube 19 being merely illustrative of a particular source. The "reactance tube" 9 in combination with its quadrature circuit 13 then serves as a means for controlling the resonant frequency of the tuned circuit 20—21—22, whether the frequency of the alternating current applied thereto (from the said external source) varies or not, and for any desired frequency applied to grid 10.

It is worthwhile here to refer to another important use of the present invention. Since it is possible reliably to synchronize the controlled oscillator 2 with very weak signals, even if such signal be below the prevailing noise level, it will be seen that the circuits illustrated herein may, if desired, be utilized solely as amplifiers of unmodulated, or frequency modulated, signals.

At this point it will be useful to summarize the basic properties of the phase detector (or reactance control) tube 9 in its preferred embodiment, i. e. with grid 11 driven with a signal large enough to ensure class C operation and with grid 10 excited by a sine wave signal of like frequency: (1) The plate current $i_p$ is always in phase with the signal on grid 11 regardless of the phase of the signal on grid 10 (see Figs. 4*a*, 4*b*, 4*c*). (2) The magnitude of $i_p$ has a median value which is the value of $i_p$ with no signal applied to grid 10. (3) With a signal on grid 10, the departure of the magnitude of $i_p$ from its median value is proportional to the product of the magnitudes of the signals on grids 10 and 11 times the sine of the phase departure from the normal quadrature phase relation between the said signals. When the two grid signals are in phase quadrature, $i_p$ has substantially its median value independently of the magnitude of the signal applied to grid 10. (4) The mean value of $i_p$ (i. e. the D. C. component) is equal to one-half the peak value of the fundamental component of plate current.

Although my invention has been described with particular reference to the several embodiments illustrated, it will be understood that the invention is capable of other forms of physical expression, and is not to be limited by the disclosure herein, but only by the scope of the appended claims.

I claim:

1. In a frequency modulation detector circuit, a source of frequency-modulated carrier signals, a phase detector tube having a pair of control grids and having both radio frequency and audio frequency output circuits, a vacuum tube oscillator having a tunable tank circuit, means coupling said source of signals to one of said control grids, means coupling said oscillator to the other of said control grids, means coupling said radio frequency output circuit to said oscillator tank circuit, the coupling circuits interconnecting said phase detector and said oscillator including a phase shifting network constructed and arranged to shift the phase of the transmitted voltage by substantially 90°.

2. A frequency modulation detector circuit as claimed in claim 1, characterized in that the signal applied to said other control grid by said oscillator is of a magnitude such that space current flows in said radio frequency output circuit during less than half of each radio frequency cycle.

3. A system for synchronizing a vacuum tube oscillator (having a resonant tank circuit) with signals from a source, said system comprising a vacuum tube having a pair of control grids and an output electrode, a first coupling means for coupling said source to one of said control grids, a second coupling means for coupling said tank circuit to the other of said control grids, the voltage applied to said other control grid by way of said second coupling means being of such magnitude that the phase of the space current reaching said output electrode is controlled primarily by said voltage, and a third coupling means for coupling said output electrode to said tank circuit, each of said coupling means being utilized to transmit voltages having frequencies of the order of the frequency of the signals derived from said source, said second and third coupling means being so constructed and arranged that the voltage (produced by the space current reaching said output electrode) applied to said resonant circuit by way of said third coupling means is in substantially phase quadrature relation to the voltage otherwise present across said resonant circuit.

4. A system for synchronizing an oscillator with signals from a source, comprising a vacuum tube having means for establishing a space current and having an output electrode arranged to provide an output voltage in response to variations in said space current, means for controlling said space current in accordance with the signals from said source, a resonant tank circuit for said oscillator, means for controlling said space current in accordance with the voltage across said tank circuit, said last means permitting space current flow during less than half of each oscillator cycle, and means for coupling said output electrode to said tank circuit to supply to said tank circuit a control voltage of oscillator frequency, the loop circuit comprising said output electrode, said coupling means, said tank circuit and said last-named space current controlling means including means for introducing a quadrature phase shift, whereby the said control voltage is in phase quadrature to the normal oscillator voltage across said tank circuit.

5. In an electrical control system, a resonant circuit, means for establishing an alternating voltage across said resonant circuit, vacuum tube means responsive to said voltage for producing relatively short current pulses substantially in time phase with the peaks of said voltage, means for varying the amplitude of said current pulses, and an electrical network for applying said pulses to said resonant circuit in such phase as to affect the effective resonant frequency of said resonant circuit.

6. In an electrical control system, an electrical impedance, means for supplying an alternating voltage to said impedance, means responsive to said voltage for producing relatively short current pulses, the number of pulses produced per second being equal to the number of cycles per second of said alternating voltage, means for varying the amplitude of said pulses, and an electrical network for applying said pulses to said impedance in such phase as to affect the apparent reactance of said impedance.

7. In combination, an oscillator, an electron discharge device having a space-current control means responsive to the operation of said oscillator for effecting the flow of said space current in time-spaced discrete pulses, a control electrode for varying the root mean square value of said pulses in response to applied signals, a source of alternating current signals coupled to said control electrode, the frequency of said signals being harmonically related to the operating frequency of said oscillator, means for applying said pulse current to said oscillator in such phase that substantially only reactive power is contributed by said electron discharge device to said oscillator, and means for deriving an output voltage from said device.

8. In a frequency modulation detector system of the type employing a phase detector and an associated local oscillator synchronized with the incoming frequency-modulated carrier, the method of synchronizing said oscillator which comprises deriving a radio frequency control voltage from the output of said phase detector, and utilizing said control voltage to control the frequency of said oscillator.

9. A method of detecting a frequency-modulated carrier signal, which comprises generating a local oscillation having predetermined frequency and phase relations to the carrier signal, producing from said signal and said oscillation a wave having high and low frequency components, the amplitudes of both of which are in proportion to the frequency modulation of the carrier signal, utilizing said high frequency component to control the frequency of the generated oscillation, and deriving the detected output signal from said low frequency component.

10. A method of detecting a frequency-modulated carrier signal, which comprises generating a local oscillation having a mean frequency bearing a predetermined frequency relation to the mean frequency of the modulated carrier, establishing a predetermined, substantially fixed phase relation between said oscillation and the carrier, deriving a high frequency control voltage from said signal and said oscillation, utilizing said control voltage to vary the frequency of said oscillation according to the frequency variation of the modulated carrier, and deriving from the carrier signal and said oscillation an output signal whose magnitude is proportional to the frequency modulation of the carrier.

11. A method of detecting a frequency-modulated carrier signal, which comprises generating a local oscillation having a mean frequency bearing a predetermined frequency relation to the mean frequency of the modulated carrier, establishing a substantially phase quadrature relation between said oscillation and the carrier, deriving a high frequency control voltage from said signal and said oscillation, utilizing said control voltage to vary the frequency of said oscillation according to the frequency variation of the modulated carrier, and deriving from the carrier signal and said oscillation an output signal whose magnitude is proportional to the frequency modulation of the carrier.

12. In a frequency modulation detector system, phase detection means for producing an output in proportion to the phase difference between two signals means for applying a frequency-modulated carrier signal, to said first means, local oscillator means for generating a signal having a predetermined phase relation with the unmodulated carrier, means for applying said oscillator signal to said first means, whereby to produce an output in proportion to the frequency modulation of the carrier, means for deriving a high frequency component from said output and for utilizing said component to synchronize said oscillator means with the modulated carrier, and means for deriving from said output a relatively low frequency component whose magnitude is proportional to the frequency modulation of the carrier.

13. In a frequency modulation detector, means responsive to two phase-quadrature related signals for producing an output in proportion to departure of the signals from their quadrature relation, means for applying a frequency-modulated carrier signal to said first means, means for applying a second signal to said first means, said second signal having the same frequency as the unmodulated carrier and being substantially in phase quadrature relation therewith, whereby to produce an output in proportion to the frequency modulation of said carrier, means for controlling said last-named means according to a high frequency component of said output, and means for deriving from said output a relatively low frequency component whose magnitude is proportional to the frequency modulation of said carrier.

14. In combination, a source of input signal voltage, an oscillator, the frequency of said input signal voltage being harmonically related to the operating frequency of said oscillator, a phase detector, means for applying both the oscillator and input signal voltages to said phase detector, said phase detector having an output at oscillator frequency whose magnitude is a function of the phase relation between said oscillator and input signal voltages, and means for applying the output of said phase detector to said oscillator in such phase as to represent substantially only reactive power to said oscillator.

15. In a synchronizing system, an oscillator having a resonant tank circuit tuned to a predetermined frequency, a source of synchronizing signal, the frequency of said signal being harmonically related to said predetermined frequency, a phase detector responsive both to said synchronizing signal and to the signal generated by said oscillator, the output voltage of said phase detector being of a frequency which is substantially that of said oscillator signal, the amplitude of said output voltage being a function of the phase relation between said synchronizing signal and said oscillator signal, and means for applying said output voltage to said tank circuit in a phase relation such that said tank circuit derives substantially only reactive power from said phase detector.

16. A frequency modulation detector comprising, in combination, a source of frequency modulated carrier signals having an assigned carrier frequency, a phase detector tube having at least an anode, a cathode, and a pair of control grids, means coupling said source to one of said control grids, an oscillator having a resonant tank circuit tuned to substantially said assigned frequency, a connection between the other of said control grids and a high potential point on said tank circuit, a parallel resonant circuit broadly tuned to said assigned frequency and connected as a radio frequency load impedance in the anode-cathode circuit of said phase detector tube, said parallel resonant circuit being coupled by mutual induction to the tank circuit of said oscillator, and an audio frequency load impedance connected in the anode-cathode circuit of said phase detector tube for deriving an output signal therefrom.

17. A frequency modulation detector as claimed in claim 16, characterized in that the pass-band of said parallel resonant circuit is at least several times the deviation band of the applied carrier signals.

18. A frequency modulation detector as claimed in claim 16, characterized in that, in the operation thereof, the magnitude of the current flowing in the anode-cathode circuit of said phase detector tube is controlled primarily by the frequency variation of the signal voltage applied to said one control grid, while the relative phase of said current is controlled primarily by the oscillator voltage applied to said other control grid.

19. A phase detector circuit comprising, in combination, a phase detector tube having means for establishing a space current, an output circuit for said tube providing an output voltage whose magnitude varies as a function of said space current, a first source of signal voltage, a second source of signal voltage, the frequencies of said signal voltages being harmonically related, means responsive to the signal voltage from said first source for causing said space current to flow in relatively short pulses, the frequency and phase of said pulses being determined primarily by the signal voltage from said first source, and means responsive to the signal voltage from said second source for affecting the amplitude of said space current pulses in accordance with a function of the phase relation between said signal voltages.

20. A phase detector circuit as claimed in claim 19, characterized in that said signal voltages are of like frequency and normally in phase quadrature relation.

21. In an electrical control system, a vacuum tube oscillator, and a reactance tube circuit cooperatively associated therewith and arranged to control the operating frequency of said oscillator, said reactance tube circuit being operated under conditions wherein plate current in said reactance tube flows in discrete pulses, the duration of said pulses being less than the intervals therebetween.

22. In an electrical control system, a vacuum tube oscillator, and a reactance tube circuit cooperatively associated therewith and arranged to control the operating frequency of said oscillator, the reactance tube in said circuit being supplied with electrode voltages of such magnitude as to limit the flow of plate current therein to individual pulses, the duration of said pulses being substantially less than the time of a half cycle.

23. In a frequency control system, a vacuum tube oscillator, means including a vacuum tube responsive to the alternating voltage generated by said oscillator for providing a pulse current, the individual pulses of which occur in time synchronism with the peaks of said alternating voltage, means responsive to said pulse current for establishing a frequency control voltage of oscillator frequency, and means including a phase shifting circuit for applying said frequency control voltage to said oscillator in quadrature phase relation.

24. The combination claimed in claim 23, characterized in the provision of means, cooperating with said vacuum tube, for varying the amplitude of said pulse current.

25. A frequency modulation detector of the synchronized oscillator type, said detector comprising: a source of frequency-modulated carrier wave signal, a vacuum tube oscillator, the operating frequency of said oscillator being harmonically related to the carrier frequency of said signal, means responsive jointly to said signal and to the signal generated by said oscillator for generating a third signal, said third signal being of oscillator frequency and including a component corresponding to the frequency variations in said frequency-modulated carrier wave signal, and means for applying said third signal to said oscillator in quadrature phase relation whereby to maintain said oscillator in synchronism with said frequency-modulated carrier wave signal.

WILLIAM E. BRADLEY.

REFERENCES CITED

The following references are of record in the file of this patent:

UNITED STATES PATENTS

| Number | Name | Date |
|---|---|---|
| 2,063,588 | Crosby | Dec. 8, 1936 |
| 2,149,721 | Bell | Mar. 7, 1939 |
| 2,231,704 | Curtis | Feb. 11, 1941 |
| 2,231,992 | Guanella | Feb. 18, 1941 |
| 2,243,417 | Crosby | May 27, 1941 |
| 2,248,481 | Schuttig | July 8, 1941 |
| 2,259,000 | Nyquist | Oct. 14, 1941 |
| 2,332,540 | Travis | Oct. 26, 1943 |
| 2,340,432 | Schock | Feb. 1, 1944 |
| 2,346,331 | Roberts | Apr. 11, 1944 |
| 2,408,192 | Bell | Sept. 24, 1946 |
| 2,440,653 | Corrington | Apr. 27, 1948 |